United States Patent
Gao et al.

(10) Patent No.: US 9,501,759 B2
(45) Date of Patent: Nov. 22, 2016

(54) SEARCH QUERY AND DOCUMENT-RELATED DATA TRANSLATION

(75) Inventors: Jianfeng Gao, Woodinville, WA (US); Xuedong Huang, Bellevue, WA (US); Mei Li, Redmond, WA (US); Zhenghao Wang, Redmond, WA (US); Christopher John Brockett, Bellevue, WA (US); William B. Dolan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 13/328,924

(22) Filed: Dec. 16, 2011

(65) Prior Publication Data

US 2013/0103493 A1 Apr. 25, 2013

Related U.S. Application Data

(60) Provisional application No. 61/551,363, filed on Oct. 25, 2011.

(51) Int. Cl.
```
G06F 17/30     (2006.01)
G06F 7/00      (2006.01)
G06Q 10/10     (2012.01)
G06Q 30/02     (2012.01)
```
(52) U.S. Cl.
CPC ......... *G06Q 10/10* (2013.01); *G06F 17/30687* (2013.01); *G06Q 30/0241* (2013.01)

(58) Field of Classification Search
USPC ....................................... 707/723, 737, 739
See application file for complete search history.

(56) References Cited

U.S. PATENT DOCUMENTS

| | | | |
|---|---|---|---|
| 7,912,868 B2* | 3/2011 | Calistri-Yeh | G06F 17/3069 704/9 |
| 2002/0077891 A1* | 6/2002 | Castle et al. | 705/14 |
| 2005/0080776 A1* | 4/2005 | Colledge | G06F 17/2785 |
| 2005/0228797 A1* | 10/2005 | Koningstein | G06Q 30/0251 |
| 2009/0228353 A1* | 9/2009 | Achan et al. | 705/14 |
| 2009/0248662 A1* | 10/2009 | Murdock | G06Q 30/02 |

(Continued)

OTHER PUBLICATIONS

Hillard, et al., "Improving Ad Relevance in Sponsored Search", in Proceedings of the Third ACM International Conference on Web Search and Data Mining, Feb. 4-6, 2010, 9 Pages.

(Continued)

*Primary Examiner* — Usmaan Saeed
*Assistant Examiner* — Raquel Perez-Arroyo
(74) *Attorney, Agent, or Firm* — Florin C. Cori; Sandy Swain; Micky Minhas (57) ABSTRACT

The subject disclosure is directed towards developing a translation model for mapping search query terms to document-related data. By processing user logs comprising search histories into word-aligned query-document pairs, the translation model may be trained using data, such as probabilities, corresponding to the word-aligned query-document pairs. After incorporating the translation model into model data for a search engine, the translation model is used may used as features for producing relevance scores for current search queries and ranking documents/advertisements according to relevance.

20 Claims, 6 Drawing Sheets

(56) References Cited

U.S. PATENT DOCUMENTS

| | | | |
|---|---|---|---|
| 2010/0010895 A1* | 1/2010 | Gabrilovich | G06Q 30/0256 705/14.54 |
| 2011/0131157 A1 | 6/2011 | Iyer et al. | |
| 2011/0270672 A1* | 11/2011 | Hillard | G06Q 30/02 705/14.42 |

OTHER PUBLICATIONS

Broder, et al., "To Swing or not to Swing: Learning when (not) to Advertise", in Proceeding of the 17th ACM Cconference on Information and Knowledge Management, Oct. 2008, 10 Pages.

Ciaramita, et al., "Online learning from Click Data for Sponsored Search", in Proceeding of the 17th International Conference on World Wide Web, Apr. 21, 2008, 10 Pages.

Bartz, et al., "Natural Language Generation for Sponsored-Search Advertisements", in Proceedings of the 9th ACM Conference on Electronic Commerce, Jun. 8, 2008, 9 Pages.

Ravi, et al., "Automatic Generation of Bid Phrases for Online Advertising", in Proceedings of the Third ACM International Conference on Web Search and Data Mining, Feb. 4, 2010, 10 Pages.

Ghose et al., "An Empirical Analysis of Sponsored Search Performance in Search Engine Advertising", in Proceedings of the ACM International Conference on Web Search and Data Mining, Feb. 11, 2008, 10 Pages.

Graepel, et al., "Web-scale Bayesian Cclick-through Rate Prediction for Sponsored Search Advertising in Microsoft's Bing Search Engine", in Proceedings of the 27th International Conference on Machine Learning, Jun. 2010, 8 Pages.

Gao, et al., "Clickthrough-Based Translation Models for Web Search: From Word Models to Phrase Models", in Proceedings of the 19th ACM International Conference on Information and Knowledge Management, Oct. 26, 2010, 10 Pages.

Brown, et al., "The Mathematics of Statistical Machine Translation: Parameter Estimation", in Journal of Computational Linguistics—Special Issue on Using Large Corpora: II, vol. 19, Issue 2, Jun. 1993, 50 Pages.

"Office Action and Search Report Issued in Chinese Patent Application No. 201210413480.5", Mailed Date: Apr. 8, 2015, 19 Pages.

\* cited by examiner

SEARCH QUERY AND DOCUMENT-RELATED DATA TRANSLATION

CROSS-REFERENCE TO RELATED APPLICATION

The present application claims priority to U.S. provisional patent application Ser. No. 61/551,363, filed Oct. 25, 2011.

BACKGROUND

Searching the Internet to locate relevant documents and advertisements can be challenging because search queries and web documents/advertisements often use different language styles and vocabularies. There are various issues related to current Internet search technologies. Often, a query contains terms that are different from, but related to, the terms in the relevant document, which leads to a well-known information retrieval problem known as lexical gap problem. Occasionally, when a query contains terms having multiple meanings causing ambiguity, a search engine retrieves many documents that do not match the user's intent, which may be known as the noisy proliferation problem. Both of these issues are substantially more prevalent in Internet search due to the fact that search queries and web documents are composed by a large variety of people and in very different language styles.

Typical information retrieval methods developed in the research community, in spite of their state-of-the-art performance on benchmark datasets (e.g., the Text Retrieval Conference (TREC) collections), are based on bag-of-words and exact term matching schemes, and cannot deal with these issues effectively. Some methods employ ad-hoc measures that tend to worsen the noisy proliferation problem. Although several approaches have been proposed to determine relationships between the terms in queries and the terms in documents, most of these approaches rely on inadequate measures of term similarity (e.g. cosine similarity) according to term co-occurrences across queries and documents. For example, in a paid search system, it is desirable to locate documents (which may include advertisements) that are relevant to the search query and are of potential user interest, whereby users will more likely click them; however known techniques often return irrelevant documents because of the lexical gap problem and/or the noisy proliferation problem caused by a language discrepancy between document content and the search query.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed toward document and search query translation models between sub-languages of a common language (e.g., English). In one aspect, developing the translation model for mapping search query terms to document-related data, such as an advertisement description, involves building a word-aligned training corpus comprising word-aligned query-document pairs. In one aspect, the training corpus may be generated using logged search histories that include click events originating from search queries. For each pair, it may be assumed that a given search query translates into a document title or advertisement description that was clicked because a user would not select an irrelevant document or advertisement. After determining a word alignment between document-related words and query terms for each query-document pair (e.g., a mapping, such as a one-to-one mapping, between a query term or terms and a document-related word/phrase), translation probabilities are estimated between a certain document-related word and corresponding query term in the word alignment. These translation probabilities may be used by a search engine, which is deployed to the Internet.

In another aspect, a training mechanism for the search engine may generate the word-aligned training corpus and identify query-advertisement bilingual phrases (i.e., bi-phrases). The training mechanism may compute phrase translation probabilities associated with the query-advertisement bi-phrases and to produce phrase-based query translation probabilities for advertisements, which are provided to the search engine for ranking documents based on whether the search query may be generated or translated from data related to such documents. In another aspect, a search engine provider may use the phrase-based translation model to support advertisers with information regarding better keywords, suggested descriptions and/or the like.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards search query and document-related data translation. The document-related data may include an advertisement landing page, advertisement description, document title and/or the like. After generating the translation model that captures semantic similarities between portions of search queries and portions of documents, with or without alignment templates, the translation model may be incorporated into model data for a search engine. When the search engine is deployed, the translation model may be used as a source of feature information when mapping a search query to one or more relevant documents based on whether the search query may be translated from the document-related data.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search in general.

Figure 1:
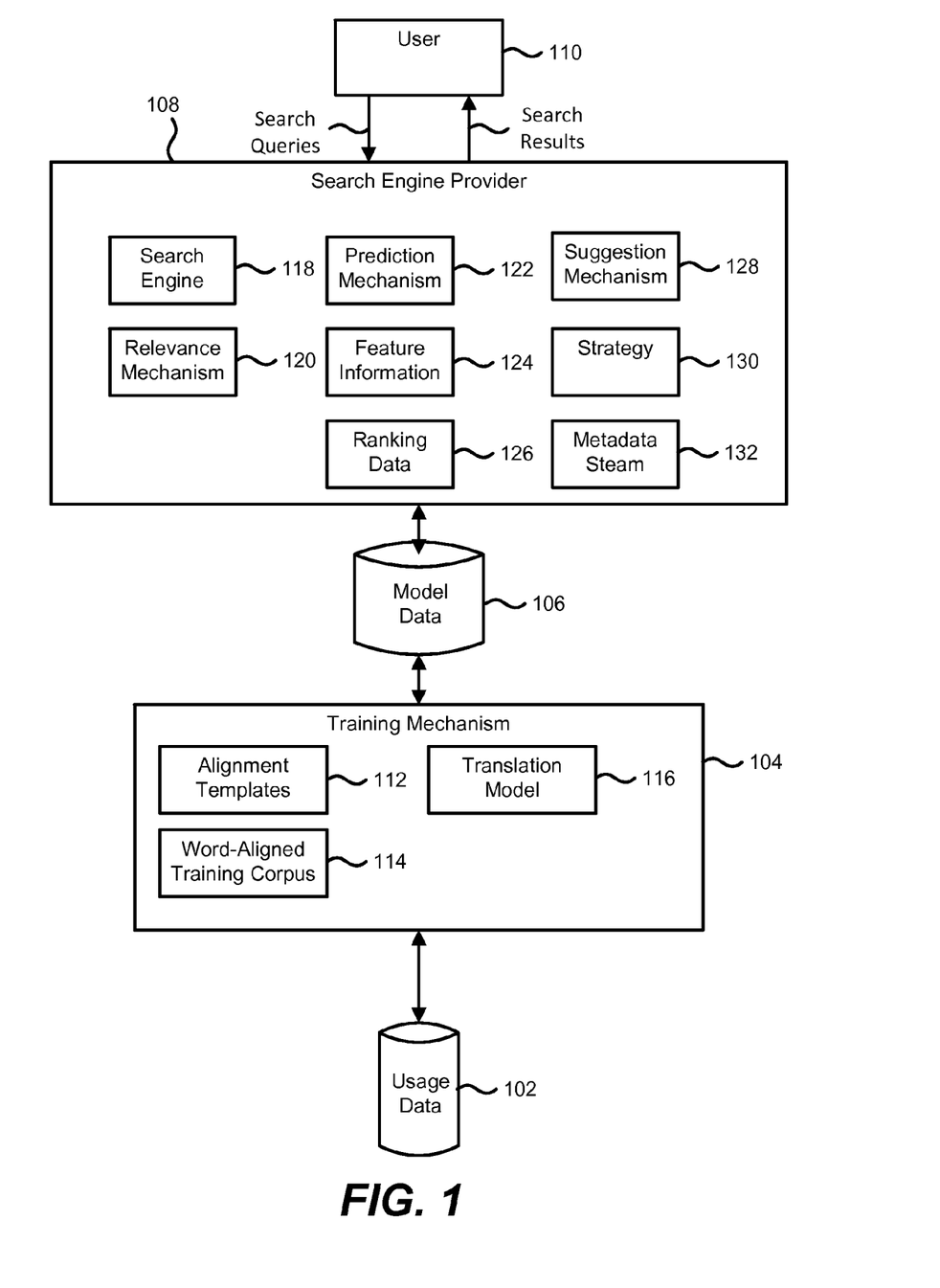
FIG. 1 is a block diagram illustrating an example system for search query and document-related data translation according to one example implementation.

FIG. 1 is a block diagram illustrating an example system for document and search query translation according to one example implementation. Components of the example system may include usage data 102, a training mechanism 104, model data 106, search engine provider 108 and an example user 110. It is appreciated that the example user 110 represents any user among a population of search engine users. When the example user 110 communicates search queries via a local computing device, an example search engine employs various models from the model data 106 to respond to the search queries with search results as described herein. After the usage data 102 accumulates over a period of a time, the training mechanism 104 analyzes the usage data 102 and generates one or more models, which are later deployed to the search engine provider 108 as an update of the model data 106. Learning how to combine multiple models to identify relevant documents may be performed offline.

According to one implementation, the usage data 102 may include aggregated search histories associated with a plurality of search engine users collected over a certain time period (e.g., a year). The usage data 102 may include logged search queries, related search results and click events that originated from the search queries and correspond to documents, including advertisements, having Uniform Resource Locators (URLs). The usage data 102 may also include document-related data, such as document titles, advertisement keywords and descriptions and/or the like.

The training mechanism 104 may utilize various data for the purpose of computing translation probabilities between a search query sub-language and a document/advertisement sub-language, such as alignment templates 112 and/or a word-aligned training corpus 114. It is appreciated that while example embodiments of these translation probabilities involve a common language, such as English, each probability refers to a lexical gap between different words or phrases that often manifests within information retrieval systems. A search query term may map to different terms having identical or similar meanings and/or to multiple meanings being conveyed in various documents/advertisements.

For example, in response to a search query for "jogging shoes," the example search engine may not identify an advertisement that includes the phrase "running shoes" as relevant, or alternatively, may categorize the advertisement with low relevance even though both phrases share a semantic relationship. In order to remedy such a lexical gap, a corresponding translation probability captures the semantic relationship or similarity between both phrases. In one implementation, the corresponding translation probability includes a value representing a chance that the phrase "running shoes" may be translated from "jogging shoes" and vice versa and hence, how relevant is the advertisement to the search query.

In order to determine whether words or phrases share a semantic relationship, according one example implementation, the training mechanism 104 extracts search query terms and document-related data associated with click events. After building a word alignment, the training mechanism 104 converts the extracted data into the word-aligned training corpus 114 comprising word-aligned query-document pairs of words or phrases used as the search query terms and/or the document-related data. In one implementation, the training mechanism 104 may use the word-aligned training corpus 114 to produce the alignment templates 112, which may include generalized versions of these words or phrases.

The alignment templates 112 may provide an alternate word alignment that uses generic word classes (e.g., word groupings that share a semantic relationship) instead of actual words. In one implementation, one or more feature (functions) associated with the example search engine may use the alignment templates 112 for ranking documents/advertisements in response to a search query. Each feature may segment the search query into a subset of the alignment templates 112 that map the search query terms to the document-related data, such as document/advertisement keywords, and produce a value that is combined with other values to form feature information (e.g., into a weighted average), such as a relevance score or a vector of relevance scores. It is appreciated that numerous other features may be employed to compute the relevance score for a particular document/advertisement, such as linguistic structure (e.g., a value related to a well-formed quality of the advertisement title/description), a number or an ordering of the alignment template subset and/or the like.

In one implementation, the training mechanism 104 may build a translation model 116 by generating mapping information between previously logged search query terms and the document-related data in the usage data 102 based on the word-aligned training corpus 114. The mapping information may include various probabilities that fit the word-aligned training corpus 114, such as a query mapping probability in addition to word-based translation probabilities and/or phrase-based translation probabilities. The training mechanism 104 may employ an expectation maximization technique to converge (e.g., train) word-based or phrase-based translation probabilities to substantially match the query-document pairs and maximize the query mapping probability for each document pair. The query translation probability may represent a conditional probability of generating a search query from one or more portions of a given document, such as an advertisement description or a document title. The example search engine may use the query translation probability as a likelihood of a correct translation or mapping between a pending search query and a potential search result as described herein.

In one example implementation, the training mechanism 104 may incorporate the translation model 116 into the model data 106 for use by the example search engine. For example, the training mechanism 104 may be combine, via interpolation (e.g., linear or log-linear interpolation), a word-based translation model with a language model, such as a unigram language model. It is appreciated that the translation model 116 may be combined with any n-gram language model, such as a bigram, trigram or four-gram model. As another example, the training mechanism 104 may incorporate the translation model 116 into a (linear or non-linear) ranking model framework in which a phrased-based translation model and/or the word-based translation model may produce various features for ranking documents/ advertisements in response to a search query as described herein. The linear ranking model framework may also utilize other models for different features. Alternatively, the training mechanism 104 may store the translation model 116 in the model data 106 for direct use (e.g., without being combined with other models) in ranking the documents/advertisements.

After the training mechanism 104 incorporates the translation model 116 into the model data 106, the example search engine, such as a search engine 118, may use the translation probabilities to facilitate search query and document mapping. In order to produce a likely relevant and useful search result listing in response to a current search query, the search engine 118 employs various mechanisms, such as a relevance mechanism 120 and/or a prediction mechanism 122, to identify and appropriately rank a set of documents, such as advertisements.

In one implementation, the relevance mechanism 120 may filter the set of documents using various feature information 124, which may be produced using the model data 106. For example, the relevance mechanism 120 may compute relevance scores/values based on translation probabilities provided by the translation model 116. A document having a highest translation probability for the current search query may also have a highest likelihood of being relevant. The relevance mechanism 120 may compare these scores with ranking data 126 and eliminate documents that fall below a threshold.

The prediction mechanism 122 may also determine a click prediction score, such as a click-through rate, for each remaining document using the feature information 124. For example, the prediction mechanism 122 may assign a highest rate to a document, such as an advertisement, having a highest posterior probability of being clicked given the current search query and/or the highest likelihood of being relevant as provided by the translation model 116. As another example, the highest click through rate may depends on various other features, such as a position the document on the search result page, the readability of the document-related data (e.g., advertisement title/description). The prediction mechanism 122 may employ a neural net ranker that integrates a wide variety of features to predict how likely an advertisement would be clicked if shown in the search result page. The set of documents having click through rates that exceed a pre-defined threshold are stored in the ranking data 126 and ultimately presented to the user 110.

In one example implementation, the search engine provider 108 may also provide one or more software components/tools, such as a suggestion mechanism 128, to assist advertisers with respect to developing advertisements that result in higher click through rates. In one example implementation, the suggestion mechanism 128 may produce a strategy 130 for improving advertisement revenue that includes one or more key words/phrases to use in a description or title to increase a ranking. In another example implementation, the strategy 130 may also include one or more search query terms/keywords (e.g., constituting whole or partial search queries) to bid in order to achieve higher traction towards the advertiser web page.

Figure 2:
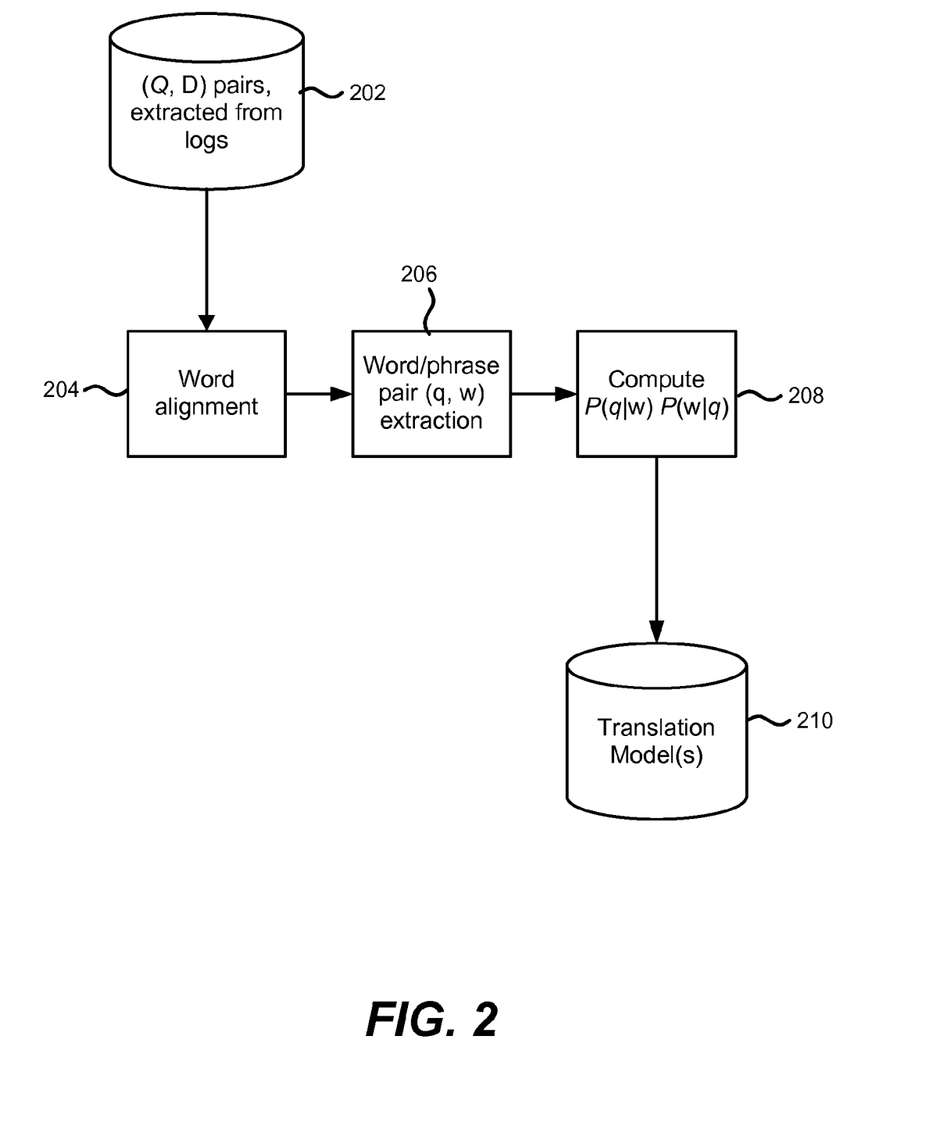
FIG. 2 is a block diagram illustrating an example pipeline for translation model training according to one example implementation.

In another example implementation, the suggestion mechanism 128 may generate a metadata stream 132 for an advertisement comprising translated words and/or phrases based on the model data 106, which includes the translation model 116. For example, the metadata stream 132 may include landing page information (e.g., URL or title), translated keywords, advertisement title/description and/or other metadata. The search engine provider 108 may append the metadata stream 132 to current metadata accompanying the advertisement. The following illustrates an example format of the metadata stream 132:

Advertiser Landing Page URL/Title
Advertisement Title
Advertisement Description
Translated Keywords FIG. 2 is a block diagram illustrating an example pipeline for translation model training according to one example implementation. Elements (e.g., steps or processes) of the example pipeline may commence at element 202 at which query-advertisement pairs are extracted from various user logs comprising search histories (e.g., advertisement clicks originating from search queries). It is appreciated that while FIG. 2 illustrates elements for document and search query translation, advertisement and search query translation may be performed in a same or similar manner. Accordingly, a training mechanism, such as the training mechanism 104 of FIG. 1, may perform at least some of the elements of the example pipeline.

Element 204 refers to training and/or applying a word alignment model to the query-document pairs. Assuming that the document-related data translates into the search query, the word alignment model in general refers to a joint likelihood of a set of model parameters and a set of search query terms given document-related data. The set of model parameters may include an arrangement $(a_1 \ldots a_j)$ of words from the document-related data, such as a document title, that maps to an index of search query term positions $(1 \ldots j)$. This arrangement, which may be referred to herein as a word alignment, may be represented as a numerical series in which each $a_j$ has a value i between 0 and l (e.g., a length of the document-related data, such as the document title or keywords/tags) such that if the word at position j of the search query is connected to the word at position i of the document title, then $a_j=i$, and if it is not connected to any document word, then $a_j=0$.

The word alignment model may be based on dependencies between the document words and search query terms. In one implementation, the word alignment model may assume each position in the word sequence has an equal probability of being assigned a corresponding word in the search query or may compute conditional probabilities for each document title position. For example, a first word in a document title may have a higher probability of mapping to a search query term than any other word position. The word alignment may provide additional information than a co-occurrence count between two words/phrases. For example, translation probabilities estimated using the word alignment may account for distortions or consistencies regarding positions of one word/phrase in a search query that map to another word/phrase in a document title.

The training mechanism may employ various techniques (e.g., Expectation Maximization and variations thereof) for generating the word alignment. Some of these techniques, such as a Viterbi technique/algorithm, may remove certain "hidden" words that do not translate into the other sub-language and/or enable a one to one mapping between query terms and document title words. In one example implementation, the training mechanism computes a most probable word sequence for each query-advertisement bilingual word or phrase (i.e., bi-phrase), which are consecutive words or phrases that may be translated from one sub-language to another sub-language as units. These word sequences may enable the training mechanism to focus on key words that form a distillation of the advertisement and assume that the search query is generated or translated from these key words.

Element 206 is directed to word/phrase pair extraction. Each pair (q,w) comprises one or more search query terms (q) and one or more document-related words (w), such as words in an advertisement title or description. Element 208 refers to computing a translation probability p(q|w) and a translation probability p(w|q) based on the word alignment. In one example implementation, the translation probability p(q|w) denotes a conditional probability (e.g., a likelihood) that a certain term or terms q may be translated from a given word or words w. In another example implementation, the translation probability p(w|q) denotes a conditional probability (e.g., a posterior probability) that a certain word or words w may be translated from a given term or terms q.

The word translation probability P(q|w) may be obtained using the training data (e.g., the query-document pairs, denoted by $\{(Q_i, D_i), i=1 \ldots N\}$), derived from the user logs. The training method may follow a standard procedure of training statistical word alignment models. In one implementation, the model parameters θ are optimized by maximizing the translation probability of generating queries from titles over the training data:

$$\theta^* = \mathrm{argmax}_\theta \prod_{i=1}^{N} P(Q_i \mid D_i, \theta), \quad (1)$$

P(Q|D,θ) takes the form of the known word alignment model as the following equation where ε is a constant, J is the length of Q, and l is the length of document-related data D:

$$P(Q \mid A, \theta) = \frac{\varepsilon}{(l+1)^J} \prod_{q \in Q} \sum_{w \in A} P(q \mid w, \theta) \quad (2)$$

To find optimal word translation probabilities, an Expectation Maximization (EM) algorithm is used, running for some number of (e.g., three) iterations over the training data, for example, as a means to avoid over-fitting. An alternative is to decompose P(Q|A) at the phrase level and train a phrase-based translation model as described herein.

Element 210 refers to storing the learned translation probabilities into a set of translation models. The models capture how likely a search query maps to a document or vice verse at levels of word, n-gram and phrase. Let Q denote a search query, and D denote a particular description of a document (e.g., the title of the web page or an advertisement landing page). As described herein, for each (Q, D) pair, where one or more users who inputted Q also clicked D, it may be assumed that D is relevant with respect to Q. An example translation model may provide translation probabilities for any (Q,D) pair, such as P(Q|D) and P(D|Q), or, specifically, any (Q,A) pair where A represents the advertisement-related data (e.g., the title of the advertisement landing page), such as P(Q|A) and P(A|Q). These translation probabilities may be decomposed and reliably estimated using various techniques. As an example, a parameter estimation technique is used in Equation (3) as an example to show how to compute P(Q|D) and train the translation model.

Let $Q=q_1 \ldots q_J$ be a query and $D=w_1 \ldots w_l$ be the title or description of a web document or an advertisement page (e.g., a landing document). The word-based translation model assumes that both Q and D are bag of words, and that the translation probability of Q given D is computed as:

$$P(Q \mid A) = \prod_{q \in Q} \sum_{w \in A} P(q \mid w) P(w \mid D). \quad (3)$$

Here P(w|D) is the unigram probability of word w in A, and P(q|w) is the probability of translating w into a query term q. In general, the translation model allows translating w to other semantically related query terms by assigning those other terms a nonzero probability.

Turning to ranking documents, the word-based translation model of Equation (3) may be smoothed before it can be applied to document ranking. One suitable smoothed model is defined as:

$$P(Q \mid D) = \prod_{q \in Q} P_s(q \mid D) \quad (4)$$

Here, $P_s(q,D)$ is a linear interpolation of a background unigram model and a word-based translation model where $\alpha \in [0, 1]$ is the interpolation weight empirically tuned:

$$P_s(q \mid D) = \alpha P(q \mid C) + (1 - \alpha) \sum_{w \in A} P(q \mid w) P(w \mid D) \quad (5)$$

P(q,w) is the word-based translation model that may be estimated using either Equation (1) or Equation (2). P(q|C) and P(w|D) represent the unsmoothed background and document models, respectively, and estimated using maximum likelihood estimation in the following equations:

$$P(q \mid C) = \frac{C(q; C)}{|C|} \quad (6)$$

$$P(w \mid D) = \frac{C(w; D)}{|D|} \quad (7)$$

C(q;C) and C(w;D) are the counts of q in a collection C of (q,w) pairs and in the document, respectively; and |C| and |D| are the sizes of the collection and the document, respectively. In one implementation, while the search query and the document may be associated with different sub-languages, because an underlying language is the same, every word/phrase has some probability associated with self-translation (i.e., P(q=w|w)>0). On one hand, low self-translation probabilities reduce retrieval performance by giving low weights to the matching terms. On the other hand, very high self-probabilities do not exploit the merits of the translation models. According to one implementation, Equation (5) is revised into Equation (8) so as to explicitly adjust the self-translation probability by linearly mixing the translation based estimation and maximum likelihood estimation:

$$P_s(q|A) = \alpha P(q|C) + (1-\alpha)P_{mx}(q|D), \text{ where} \qquad (8)$$

$$P_{mx}(q|A) = \beta P(q|D) + (1-\beta)\sum_{w \in D} P(q|w)P(w|D) \qquad (9)$$

In the above equations, $\beta \in [0, 1]$ is the tuning parameter, indicating a degree to adjust the self-translation probability. Setting $\beta=1$ in Equation (9) reduces the translation model to a unigram language model with Jelinek-Mercer smoothing. $P(q|D)$ in Equation (9) is the unsmoothed document model, estimated by Equation (7), such that $P(q|D)=0$, for $q \notin D$.

Figure 3:
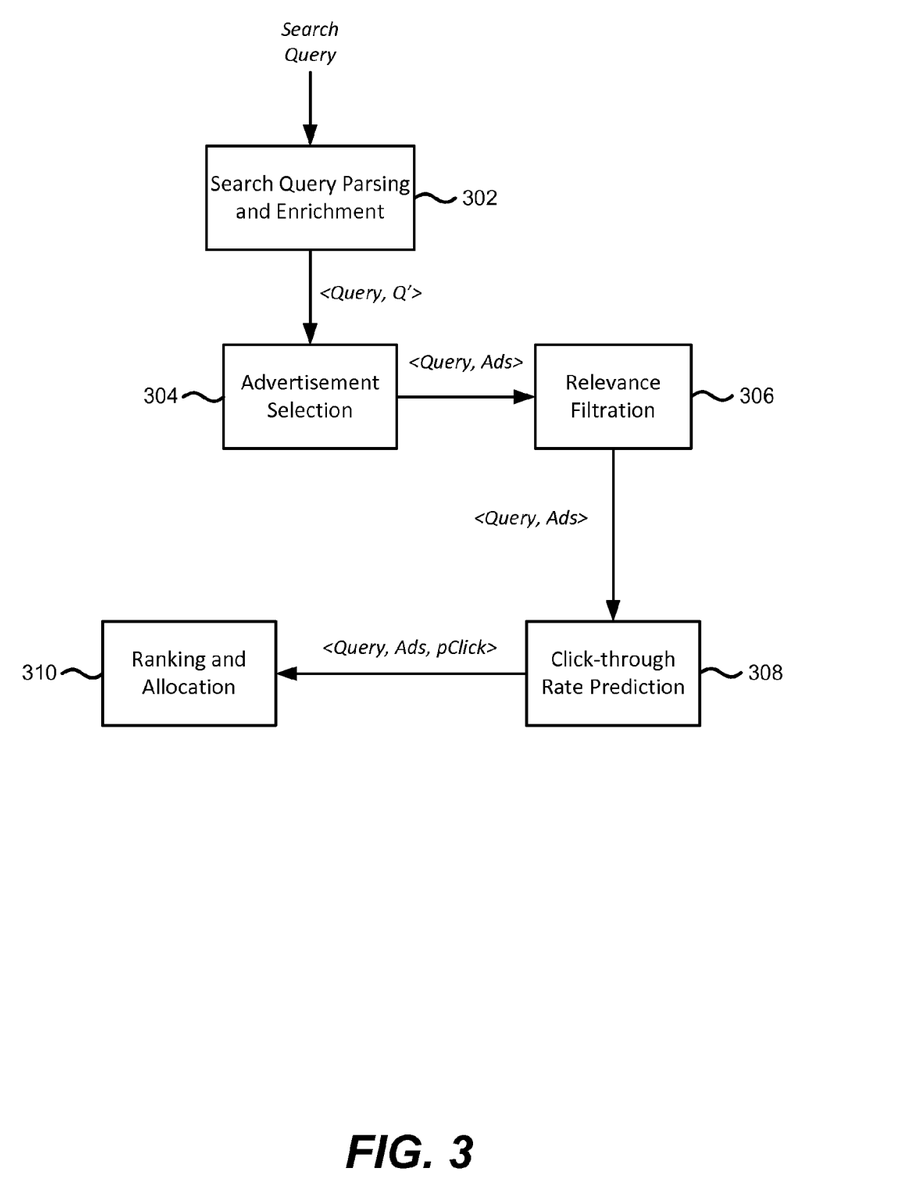
FIG. 3 is a block diagram illustrating an example run-time data flow for a paid advertisement search according to one example implementation.

FIG. 3 is a block diagram illustrating an example run-time data flow for a paid advertisement search according to one example implementation. Processes executed during the example run-time data flow commence at a search query parsing and enrichment process 302. As illustrated, a search query is partitioned into a set of terms $Q=\{q_1 \ldots q_J\}$ and enriched into Q'. For example, enriched search query Q' may include additional/intermediate search terms and/or target categories. The enriched search query is communicated to an advertisement selection process 304, which identifies a set of advertisements that map to one or more target categories and/or a portion of the set of terms.

In one implementation, based on a translation model, a relevance filtration process 306 may reduce the set of advertisements into a subset of relevant advertisements having translation probabilities exceeding a predefined threshold. The relevance filtration process 306 may apply a word-based translation model to translate each advertisement key word into query term independently or apply a phrase-based translation model to perform the advertisement keyword to query term translation using sequences of words. In another implementation, the relevance filtration process 306 may further reduce the subset of relevant advertisements using other features. For each advertisement, values for these features may be combined into a relevance score for relevant advertisement refinement.

In one implementation, a click-through rate prediction process 308 may also use the translation model to compute a probability/value as to how likely a user is to select/click certain relevant advertisement. Based on the relevance score(s) and the click-through prediction rate(s), a ranking and allocation process 310 ranks the subset of relevant advertisements and produces a search result page comprising the subset of relevant advertisements in order of rank.

Figure 4:
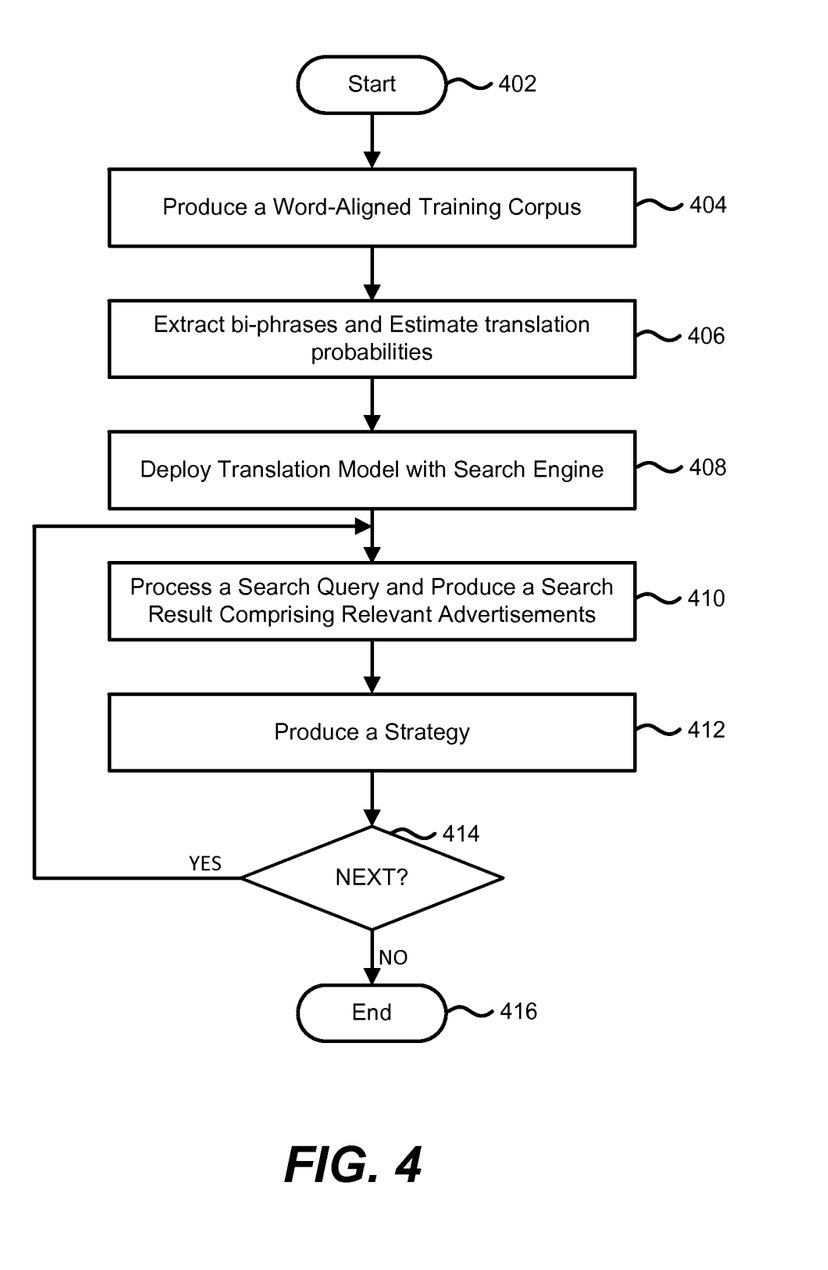
FIG. 4 is a flow diagram illustrating example steps for developing a phrase-based translation model for mapping search query terms with advertisement-related data according to one example implementation.

FIG. 4 is a flow diagram illustrating example steps for deploying a phrase-based translation model for mapping an advertisement to a search query according to one example implementation. The example steps may commence at step 402 and proceed to step 404 at which a word-aligned training corpus is produced. A search engine instructs a training mechanism to produce a word alignment between each word of a search query and a corresponding word in advertisement-related data, such a description or title. In one implementation, the word alignment may refer to a mapping between words in different sub-languages that translate into each other. The training mechanism may use a pre-determined word alignment model or may train the word alignment model using logged search engine usage data (e.g., click-through data).

In another implementation, the word alignment may indicate, for each consecutive phrase in the search query (Q), a corresponding phrase in the advertisement title (A) from which the consecutive phrase originated and vice versa. First, the training mechanism learn two word-based translation models using the expectation maximization training of the word alignment model on query-advertisement (title) pairs in two directions: A first word-based translation model from search query to the advertisement title and a second word-based translation model from the advertisement title to the search query. Based on the word alignment model (e.g., a "hidden" word alignment) between each search query and each advertisement title, the training mechanism determines a Viterbi word alignment, $V^* = v_1 \ldots v_j$ where query term position j maps to an advertisement title (A) word $v_j$, in each direction according to the following equations (10) to (12):

$$V^* = \operatorname{argmax}_V P(Q, V|A) \qquad (10)$$

$$= \operatorname{argmax}_V \left\{ P(J|I) \prod_{j=1}^{J} P(q_j|w_{v_j}) \right\} \qquad (11)$$

$$= \left[ \operatorname{argmax}_{v_j} P(q_j|w_{v_j}) \right]_{j=1}^{J} \qquad (12)$$

The Viterbi word alignment in general refers to a word alignment in which $P(Q,V|A)$ is largest. To compute the Viterbi word alignment, for each j, the training mechanism selects the $v_j$ that renders the word translation probability $P(q_j|w_{v_j})$ as large as possible. In one implementation, the two Viterbi word alignments are combined by the following method: starting from an intersection of the two Viterbi word alignments, gradually include more alignment mappings or connections according to a set of well-known heuristic rules.

Step 406 is directed to extracting bi-phrases and estimating phrase translation probabilities. In one example implementation, the bi-phrases include bilingual phrases in conformity with the combined word alignment and selected using the set of well-known heuristic rules. For example, the training mechanism may establish a maximum phrase length.

As described herein, the phrase-based translation model may be a generative model that translates the advertisement-related data (A) into the search query (Q). Instead of translating single words in isolation, as in a word-based translation model, the phrase model translates sequences of words (i.e., phrases) in A into sequences of words in Q, thus incorporating contextual information. For example, it may be learned that the phrase "stuffy nose" can be translated from "cold" with relatively high probability, even though neither of the individual word pairs (i.e., "stuffy"/"cold" and "nose"/"cold") might have a high word translation probability.

In one implementation, the advertisement landing page description (A) is broken into K non-empty word sequences $w_1, \ldots, w_k$, then each is translated to a new non-empty word sequence $q_1, \ldots, q_k$, and these phrases are permuted and concatenated to form the query Q. Variables w and q denote consecutive sequences of words. Table 1 illustrates the generative process for an example search query Q:

TABLE 1

| Text | Variable/Step |
|---|---|
| . . . cold home remedies . . . | Ad (A) |
| ["cold", "home remedies"] | Segmentation (S) |
| ["stuffy node", "home remedy"] | Translation (T) |
| (1→2, 2→1) | Permutation (M) |
| "home remedy stuffy nose" | Search Query (Q) |

Let S denote the segmentation of A into K phrases $w_1, \ldots, w_K$, and let T denote the K translation phrases $q_1, \ldots, q_K$ of which $(w_i, q_i)$ pairs are referred to as bi-phrases. Let M denote a permutation of K elements representing a final reordering step. Let B(A, Q) denote the set of S, T, M triples that translate A into Q. If a uniform probability distribution over segmentations is assumed, then the phrase-based translation probability can be defined as:

$$P(Q|A) \propto \sum_{\substack{(S,T,M) \in \\ B(D,Q)}} P(T|A, S) \cdot P(M|A, S, T) \quad (13)$$

After applying the maximum approximation to the summation, the following equation is produced:

$$P(Q|A) \approx \max_{\substack{(S,T,M) \in \\ B(D,Q)}} P(T|A, S) \cdot P(M|A, S, T) \quad (14)$$

Given the Viterbi word alignment V*, when scoring a given query-advertisement pair from the word-aligned training corpus or during deployment with a search engine, the training mechanism utilizes S, T, M triples that are consistent with V*, which are denoted as B(C, Q, V*). In one implementation, consistency means that if two words are aligned in V*, then these words are to appear in the same bi-phrase $(w_i, q_i)$. Once the word alignment is fixed, the final permutation is uniquely determined, so that factor may be discarded, thus rewriting Equation (14) as:

$$P(Q|A) \approx \max_{\substack{(S,T,M) \in \\ B(D,Q)}} P(T|A, S) \quad (15)$$

For the remaining factor P(T|A,S), it is assumed that a segmented query $T=q_1 \ldots q_K$ is generated from left to right by translating each phrase $(w_1 \ldots w_K)$ independently as described in the following equation where $P(q_k|w_k)$ is a phrase translation probability:

$$P(T|A, S) = \prod_{k=1}^{K} P(q_k|w_k) \quad (16)$$

The phrase-based query translation probability P(Q|A), defined by Equations (10) to (16), may be efficiently computed using a dynamic programming approach. Let the quantity $\alpha_j$ be the total probability of a sequence of query phrases covering the first j query terms. P(Q|A) may be computed using the following recursion:

$$\text{Initialization } \alpha_0 \quad (17)$$

$$\text{Induction: } \alpha_j = \sum_{j' < j, q = q_{j'+1} \ldots q_j} \{\alpha_{j'} P(q|w_q)\} \quad (18)$$

$$\text{Total: } P(Q|A) = \alpha_j \quad (19)$$

Given the collected bilingual phrases, the phrase translation probability $P(q|w_q)$ is estimated using relative counts where N(w,q) is the number of times that w is aligned to q in training data:

$$P(q|w_q) = \frac{N(w, q)}{N(w)} \quad (20)$$

As an alternative to Equation (20), the training mechanism may estimate a quantity, known as a lexical weight, as a smoothed version of the phrase translation probability. Let P(q|w) be the word translation probability described herein for word-based translation models (e.g., Equations (1) to (9)) and V the word alignment (e.g., a "hidden" word alignment) between the query term position i=1 ... |q| and the title word position j=1 ... |w|, then the lexical weight, denoted by $P_w(q|w, V)$ may be computed using the following equation:

$$P_w(q|w, V) = \prod_{i=1}^{|q|} \frac{1}{|\{j|(j, i) \in V\}|} \sum_{\forall (i,j) \in V} P(q_i|w_j) \quad (21)$$

Step 408 is directed to deploying the phrase-based translation model with the search engine. In one implementation, the search engine may include an information retrieval system that uses the phrase-based translation model as a source of feature information when ranking documents/advertisements or, alternatively, may employ the translation model to directly rank the advertisements in response to a search query. In one alternative implementation, a set of phrase-based translation models may used as compute various feature values including example features P(A|Q) and P(Q|A), which refer to translating an advertisement title from a search query and vice versa.

Some information retrieval system embodiments utilize a linear ranking model framework in which different models in addition to one or more translation models may be incorporated as features. The linear ranking model assumes a set of M features, $f_m$ for m=1 ... M. Each feature is an arbitrary function that maps (Q,A) to a real value, $f(Q,A) \in \mathbb{R}$. The model has M parameters, $\lambda_m$ for m=1 ... M, in which each one is associated with one feature function.

Step 410 is directed to processing a search query and producing a search result comprising relevant advertisements. The relevance score of an advertisement A associated with a search query Q is computed as:

$$\text{Score}(Q|A) = \sum_{m=1}^{M} \lambda_m f_m(Q, A) \quad (22)$$

According to various implementations, any combination of the following translation model-based features may be used in addition to or instead of other well-known features. As an example, the search engine may utilize a phrase translation feature, $f_{PT}(Q,A,V)$, equal to log P(Q|A) where P(Q|A) is computed by Equations (17) to (19) and the phrase translation probability $P(q|w_q)$ is estimated using Equation (20). As another example, the search engine may utilize a lexical weight feature, $f_{LW}(Q,A,V)$, equal to log P(Q|A) where P(Q|A) is computed using Equations (17) to (19) and the phrase translation probability $P(q|w_q)$ is estimated using Equation (20).

Furthermore, the search engine may utilize a phrase alignment feature, $f_{PA}(Q,A,B)$, equal to $\Sigma_{k=2}^{K}|a_k - b_{k-1} - 1|$ where B is a set of K bilingual phrases, $a_k$ is the start position of the title phrase that was translated into the kth query phrase, and $b_{k-1}$ is the end position of the title phrase that was translated into the (k−1)th query phrase. The feature models the degree to which the query phrases are reordered. For all possible B, the search engine only computes a feature value according to the Viterbi alignment B, $B^*=\text{argmax}_B P(Q, B|A)$. $B^*$ may be computed using a technique similar to the dynamic programming recursion of Equations (17) to (19), except that the sum operator in Equation (18) is replaced with the max operator.

The search engine may also utilize an unaligned word penalty feature, $f_{UWP}(Q,A,V)$, defined as the ratio between the number of unaligned query terms and the total number of query terms. The search engine may also utilize a language model feature, $f_{LM}(Q,A)$, equal to log P(Q|A) where P(Q|A) is the unigram model with Jelinek-Mercer smoothing (i.e., defined by Equations (4) to (9), with β=1). The search engine may also utilize a word translation feature, $f_{WT}(Q,A)$, equal to log P(Q|A) where P(Q|A) is the word translation model defined by Equation (3) where the word translation probability is estimated with the expectation maximization training of Equation (1).

After computing a relevance score for each associated advertisement, step 410 is further directed to ranking the associated advertisements according to the relevance score. Such a ranking generates the search result listing the associated advertisements in order of rank. Some of the associated advertisements may have been removed for failing to achieve a minimal relevance score.

Step 412 is directed to producing a strategy for one or more advertisers associated with the ranked advertisements. A suggestion mechanism of the search engine may use translation model to produce candidate keywords to improve keyword bidding. The suggestion mechanism may also produce candidate advertisement descriptions according to some pre-selected keywords for improving advertisement web pages or landing pages. The suggestion mechanism may also produce information indicating an improved allocated budget based on the click prediction likelihood (i.e., click-through rate). Step 414 determines whether to process a next search query. If there are no more search queries, step 414 proceeds to step 416. If there are more search queries, step 414 returns to step 410. Step 416 terminates the example steps.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
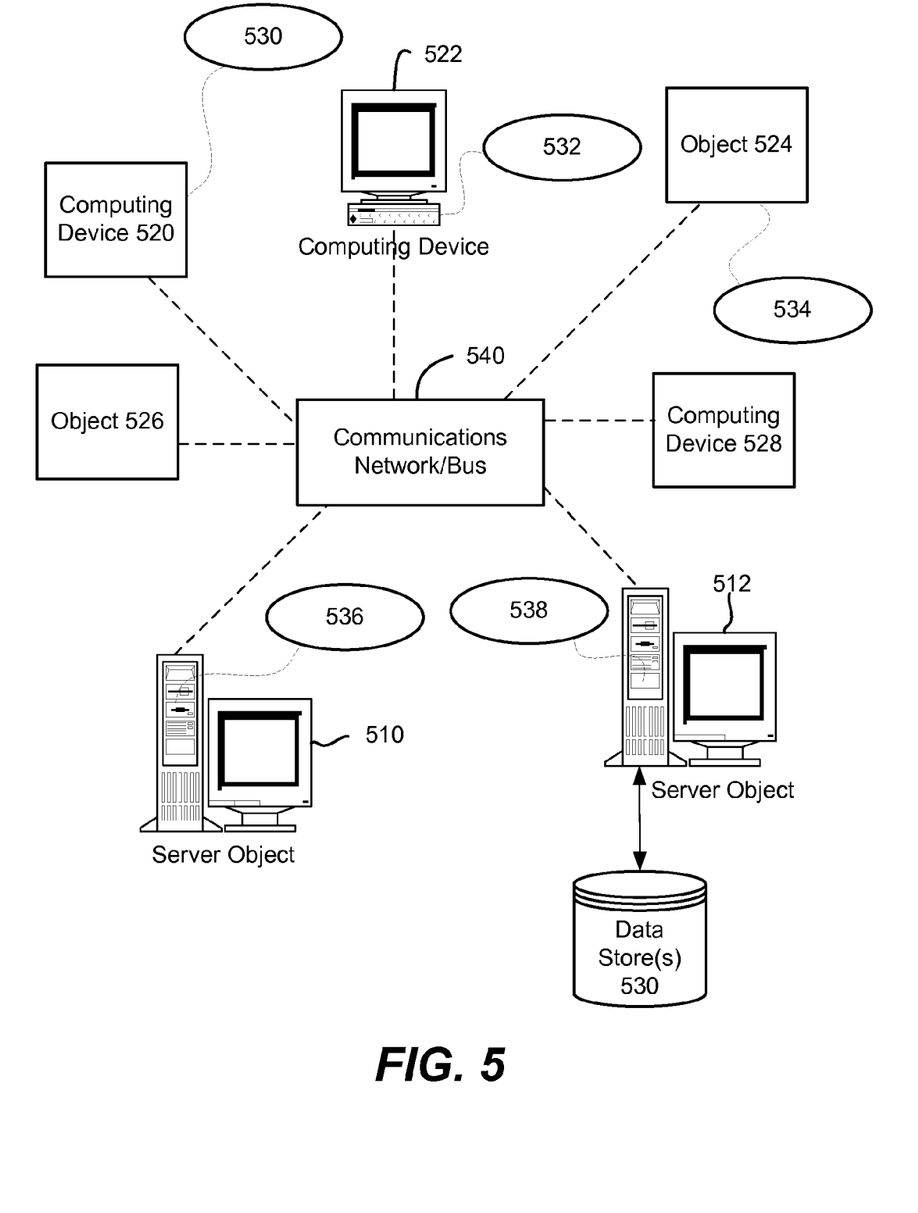
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
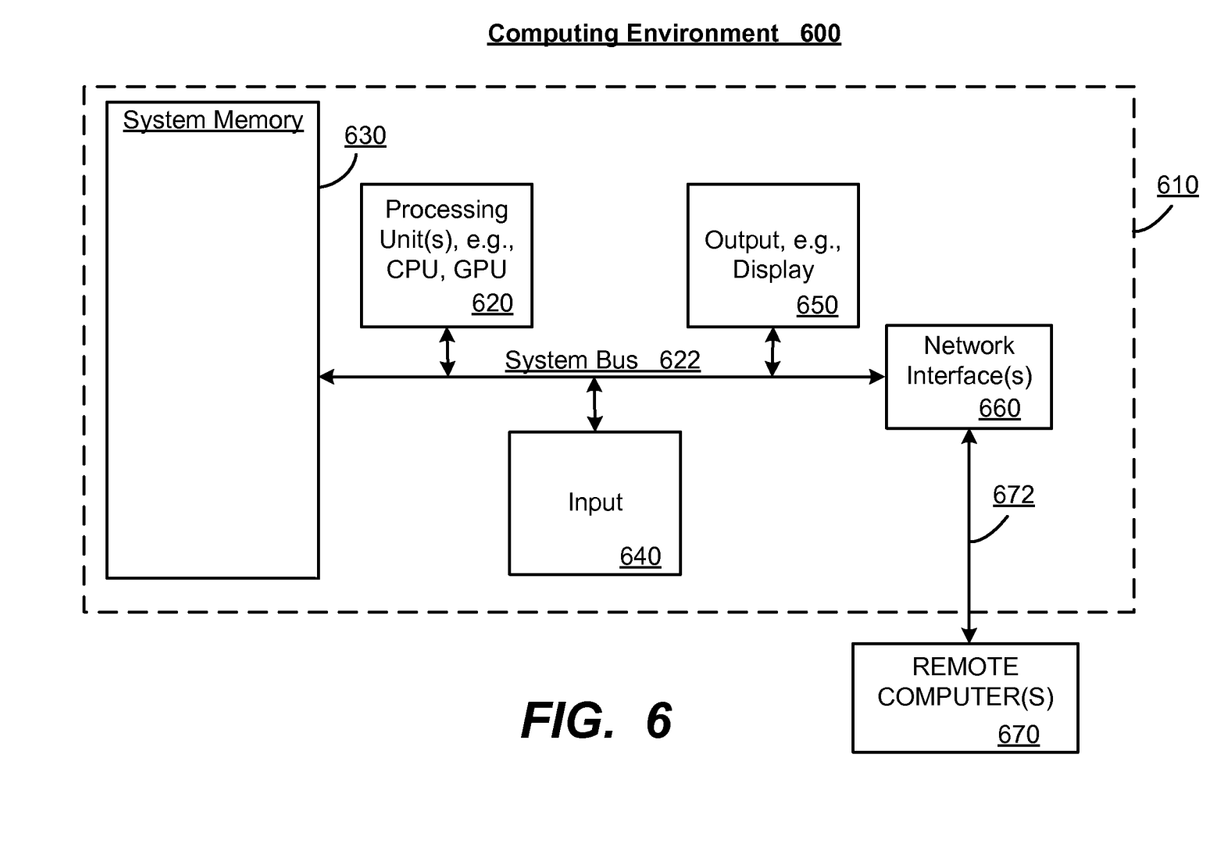
FIG. 6 is a block diagram representing an example non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system, comprising, at least one processor, a memory communicatively coupled to the at least one processor and including components comprising, a training mechanism configured to process a word-aligned training corpus and identify query-advertisement bi-phrases, the query-advertisement bi-phrases corresponding to association of query terms with advertisements based on previously logged click events, the training mechanism further configured to compute phrase translation probabilities associated with the query-advertisement bi-phrases, and produce phrase-based query translation probabilities for the advertisements and to provide the phrase-based query translation probabilities to a search engine, wherein the phrase-based query translation probabilities indicate a likelihood of translation of the query terms from the advertisements in the query-advertisement bi-phrases, wherein each phrase-based query translation probability is estimated based on a product of phrase translation probabilities computed over phrases in the query-advertisement bi-phrases associated with advertisement data in the word-aligned training corpus, wherein each phrase translation probability is computed based on a quantity of times a phrase in the advertisement data is aligned to a phrase in a query term.

2. The system of claim 1, wherein the search engine further comprises a ranking mechanism configured to compute a scores for the advertisements given a search query based on the phrase-based query translation probabilities.

3. The system of claim 2, wherein the ranking mechanism is further configured to filter a search result for the search query based on the scores for the advertisements.

4. The system of claim 2, wherein the ranking mechanism is further configured to compute feature information for a phrase translation model comprising the phrase translation probabilities.

5. The system of claim 1, wherein the search engine further comprises a prediction mechanism configured to compute probabilities for the advertisements given a search query based on the phrase-based query translation probabilities and a set of features associated with a search engine result.

6. The system of claim 1, wherein the system further comprises a suggestion mechanism configured to produce a strategy for maximizing revenue from a set of advertisements associated with an advertiser, the strategy including suggesting one or more keywords or key-phrases.

7. One or more computer storage media having computer-executable instructions, which upon execution perform operations, comprising:
 accessing a translation model that captures semantic similarities between search queries and advertisements, the translation model comprising query-advertisement bi-phrases, each of the query-advertisement bi-phrases corresponds to association of a search query with an advertisement pertaining to previously logged click events;
 computing phrase-based translation probabilities associated with query-advertisement bi-phrases indicating a likelihood of translation of terms of the search query to one or more relevant advertisements based on the previously logged click events, wherein each phrase-based query translation probability is estimated based on a product of phrase translation probabilities computed over phrases in the query-advertisement bi-phrases associated with the advertisement pertaining to the previously logged click events, wherein each phrase translation probability is computed based on a quantity of times a phrase in the advertisement is aligned to a phrase in the search query;

mapping a current search query into one or more relevant advertisements using the phrase-based translation probabilities;

ranking the one or more relevant advertisements based on the translation model by using functions associated with the translation model, the functions being used to compute a weighted score for the one or more relevant advertisements; and producing a search result that comprises the one or more relevant advertisements in order of rank for the current search query.

8. The one or more computer storage media of claim 7 having further computer executable instructions comprising: generating a metadata stream for advertisement-related data.

9. The one or more computer storage media of claim 7 having further computer-executable instructions comprising: producing a strategy for maximizing revenue from a set of advertisements associated with an advertiser.

10. The one or more computer storage media of claim 7 having further computer-executable instructions comprising: generating phrase-based feature information for ranking one or more relevant documents based on alignment templates.

11. In a computing environment, a method performed at least in part on at least one processor, comprising processing a word-aligned training corpus of a training model to identify query-advertisement bi-phrases, the query-advertisement bi-phrases corresponding to association of query terms with advertisements based on previously logged click events, the training mechanism further configured to compute phrase translation probabilities associated with the query-advertisement bi-phrases, and produce phrase-based query translation probabilities for the advertisements and to provide the phrase-based query translation probabilities to a search engine, wherein the phrase-based query translation probabilities indicate a likelihood of translation of the query terms from the advertisements in the query-advertisement bi-phrases, wherein each phrase-based query translation probability is estimated based on a product of phrase translation probabilities computed over phrases in the query-advertisement bi-phrases associated with advertisement data in the word-aligned training corpus, wherein a phrase translation probability is computed based on a quantity of times a phrase in the advertisement data is aligned to a phrase in a query term.

12. The method of claim 11 further comprising processing a translation model to process search engine usage data to identify word-aligned query-document pairs to train the translation model using a posterior distribution and a likelihood distribution associated with the word-aligned query-document pairs.

13. The method of claim 12, wherein processing the translation model further comprises estimating translation probabilities representing semantic relationships between a search query sub-language and document sub-language.

14. The method of claim 13, wherein estimating the translation probabilities further comprises adjusting self-translational probabilities.

15. The method of claim 13, wherein estimating the translation probabilities further comprises computing query translation probabilities for the advertisements.

16. The method of claim 11 further comprising generating a metadata stream associated with an advertisement.

17. The method of claim 11 further comprising producing one or more suggested keywords for an advertisement.

18. The method of claim 11 further comprising generating feature information for relevant documents based on the query terms.

19. The method of claim 18 further comprising computing a relevance score for the relevant documents based on the translational probabilities.

20. The method of claim 18 further comprising computing a click prediction score for the relevant documents on a search result generated based on the query terms by determining posterior probability of the relevant documents being clicked.

* * * * *